May 30, 1950 E. A. NEWMAN 2,509,987

NONLINEAR AMPLIFIER FOR GAMMA CONTROL

Filed Feb. 10, 1948

Inventor:
Edward Arthur Newman
By J. O. Ollier
Attorney

Patented May 30, 1950

2,509,987

UNITED STATES PATENT OFFICE 2,509,987

NONLINEAR AMPLIFIER FOR GAMMA CONTROL

Edward Arthur Newman, Ealing, London, England, assignor to Electric & Musical Industries Limited, Hayes, England, a company of Great Britain Application February 10, 1948, Serial No. 7,442
In Great Britain February 12, 1947

3 Claims. (Cl. 178—7.3)

This invention relates to electric amplifier circuits for amplifying electric signals and has particular but not exclusive reference to circuits employed in television for the purpose of so-called "gamma" control.

In gamma control in television it is well known to cause the amplification of an amplifier to be non-linear in order to modify the signals representing tone gradations in the picture to be reproduced. Thus, for example, if the picture contains a "shadow" area in which it is desirable to reproduce details clearly, then signals representative of the "shadow" area are expanded or amplified in greater proportion than the signals in the "white" portion of the picture. Alternatively, it may be desirable to suppress the "shadow" detail relative to the detail in the "white" portion of the picture, and this can be done by reducing the amplification of the signals representative of "black" and increasing the amplification to a greater degree of the signals representative of "white."

The adjustment of such a control changes the ratio of the peak signal amplitude in the output of the amplifier to the peak signal amplitude in the input of the amplifier, that is to say, it changes the overall gain of the amplifier for signals corresponding to "peak white." This change in overall gain for signals corresponding to "peak white," unless it is connected by a reciprocal adjustment of the overall gain, will cause undesirable change in the peak signal amplitude of the output from the amplifier.

It is known to control the overall gain of the amplifier by introducing a linear amplifier of variable gain in cascade with the non-linear amplifier and deriving a voltage substantially proportional to the change in overall peak signal gain and using this voltage so to modify the amplification of the variable gain amplifier that the overall gain remains substantially constant for the maximum value of signal amplitude present.

It is found with this arrangement, however, that whilst it operates satisfactorily provided the picture to be reproduced contains some elements of brightness corresponding to peak white, in the event of the picture representing a scene with no highlights of intensity corresponding to peak white, the overall gain will be modified in such a way as considerably to modify the non-linearity deliberately introduced.

According to the invention there is provided a circuit for amplifying electric signals, such as television picture signals, comprising means for producing control signals of constant amplitude substantially equal to the peak amplitude of said electric signals, and mixing means for interspersing said control signals in said signals to be amplified wherein the mixed signals are fed to a non-linear amplifying device of adjustable amplifying characteristic and an amplifying device of variable gain in cascade and there is provided means for developing a control dependent on the difference of amplitude of said control signals before and after amplification by said amplifying devices in cascade, said control being applied to control the gain of said amplifying device of variable gain so that the gain of said circuit for signals of peak amplitude is rendered substantially independent of adjustment of the amplifying characteristics of said non-linear amplifying device.

It will be understood that the term "amplifying" as used in the specification is not to be held as limiting the amplification of any amplifying circuit or device referred to therein to gains of greater than unity, but is inclusive of a gain of unity or less.

In order that the invention may be clearly understood and readily carried into effect, it will now be more fully described with reference to the accompanying drawings as applied by way of example to television and in which.

Figure 1:
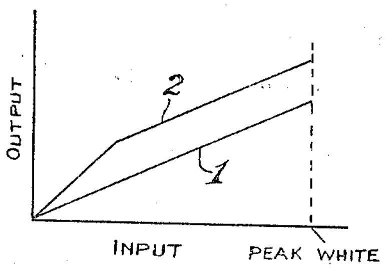
Figure 1 shows graphically the relationship between output and input of an amplifier for gamma control with no automatic gain control.

Referring now to Figure 1, curve 1 shows the characteristic of an amplifier with so-called unity "gamma" that is to say, an amplifier acting as a linear amplifier, whilst curve 2 shows the same amplifier adjusted to have a "gamma" so differing from unity that the shadow area is provided with increased detail, that is to say, low values of signal are amplified more than high values. It will be seen that the output signal corresponding to a peak white input signal has increased, which may cause overloading in some later circuit.

Figure 2:
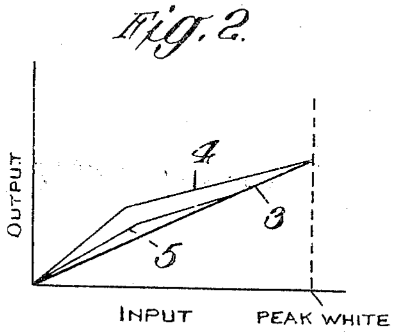
Figure 2 shows graphically the relationship between output and input of an amplifier wherein the overall gain for the peak signal present in the picture is maintained constant and shows also the same relationship for an amplifier according to the present invention.

Referring now to Figure 2, curve 3 is a characteristic identical with characteristic 1 of Figure 1; curve 4 is a characteristic of the same gamma as characteristic 2 of Figure 1, but with the overall gain controlled automatically and stabilised for the peak picture signal, that is to say, for the point of intersection of curves 4 and 3. Thus with this arrangement the output amplitude of a peak white signal is the same whether the amplifier is operated with or without unity gamma, provided there is a peak white signal present in the picture. If, however, the brightest part of the picture only corresponds with a brilliance, for example, one-half that of peak white, the gain of the amplifier will be stabilised for this level and not for peak white. The characteristic of the amplifier will then be similar to curve 5, from which it will be seen that the desirable increase in gain for low amplitude signals aimed at by the employment of a gamma suitably different from unity has been very largely lost.

In the present invention, however, a control or pilot signal is introduced the amplitude of which is sensibly equal to that of peak white so as to overcome this disadvantage.

Figure 3:
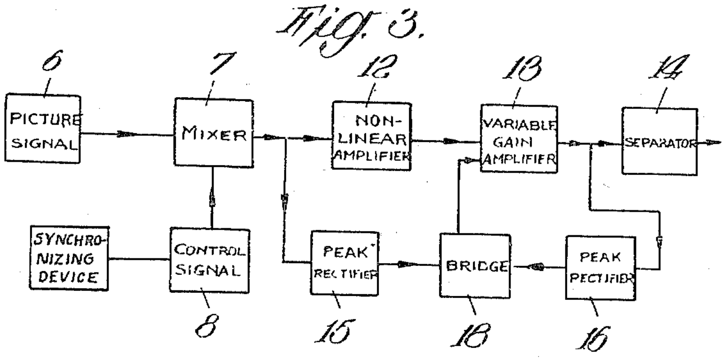
Figure 3 shows schematically an amplifier circuit according to the present invention.
Figure 4:
Figure 4 shows the waveform of television signals having said control signals interspersed therewith.

Referring now to Figure 3, 6 is a source of television picture signals and these signals are fed to the mixer 7, where they are mixed with control signals of impulsive character derived from a source 8 the peak amplitude of said control signals being adjusted so as to be sensibly equal to the peak white level of said television signals. Figure 4 of the drawings indicates diagrammatically the waveform of television signals and from this figure it will be observed that said control signals indicated at 9 are interspersed with the picture signals indicated at 10 in the intervals between successive lines during the line black-out or fly-back periods indicated at 11. The output from the mixer 7 is fed to a non-linear amplifier 12 whose degree and type of distortion can be varied by a suitable gamma control, the output from the non-linear amplifier 12 being amplified to an appropriate extent in a variable gain amplifier 13. The output signals from the amplifier 13 are fed through a separator 14 to remove the control signals 9.

The signals from the mixer 7 and the variable gain amplifier 13 are fed respectively to peak rectifier circuits 15 and 16 and the outputs from the peak rectifier circuits are compared in the bridge circuit 18 so as to produce a voltage which is applied to the variable gain amplifier 13 to cause the gain of said amplifier to alter such that as said gamma control is adjusted the overall amplification of the amplifier remains substantially constant for signals corresponding in amplitude to the amplitude of the control signals.

It will be appreciated that in a circuit according to the invention the variable gain and non-linear amplifiers may if desired each consist of several separate stages in order to achieve the required characteristics. The separate stages of the variable gain and non-linear amplifiers may be arranged in any order which may be convenient. It will also be appreciated that in the event of the television signals and the control or pilot signals being of suitably stabilised peak amplitude, the first peak rectifier 15 may if desired be omitted, and the bridge circuit 18, modified accordingly.

I claim:

1. A circuit for amplifying electrical signals such as television picture signals, comprising means for producing control signals of constant amplitude substantially equal to the peak amplitude of said electric signals, mixing means for interspersing said control signals in said signals to be amplified, a nonlinear amplifying device of adjustable amplifying characteristic and an amplifying device of variable gain connected in cascade, said mixing means being connected to feed the mixed electrical and control signals to said amplifying devices in cascade, and means responsive to the difference in amplitude of said control signals before and after amplification by said cascade connected amplifying devices, to develop a control voltage, said latter means being connected to said amplifying means for controlling the gain of said variable gain amplifying device to render the gain of the circuit for signals of peak amplitude substantially independent of the amplifying characteristic adjustment of said nonlinear amplifying device.

2. A circuit according to claim 1, wherein the means for developing said control voltage comprises a rectifier responsive to the control signals fed to the nonlinear amplifying device, a rectifier responsive to the control signals after amplification by the device of variable gain, and means responsive to the difference between the outputs of said rectifiers.

3. In a television system, a circuit arrangement according to claim 1 for gamma control including means for interspersing said control signals in the intervals between successive lines of the picture signals.

EDWARD ARTHUR NEWMAN.

REFERENCES CITED

The following references are of record in the file of this patent:

UNITED STATES PATENTS

| Number | Name | Date |
|---|---|---|
| 2,252,148 | Wheeler | Aug. 12, 1941 |
| 2,286,730 | Hall | June 16, 1942 |
| 2,363,813 | Somers | Nov. 28, 1944 |